United States Patent
Coakley

(10) Patent No.: US 12,358,062 B2
(45) Date of Patent: Jul. 15, 2025

(54) ASSEMBLY FOR POSITIONING PIPE MACHINING APPARATUS FOR MITER CUTTING

(71) Applicant: Illinois Tool Works Inc., Glenview, IL (US)

(72) Inventor: Roy C. Coakley, Northlake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/371,248

(22) Filed: Jul. 9, 2021

(65) Prior Publication Data

US 2023/0009767 A1  Jan. 12, 2023

(51) Int. Cl.
*B23D 21/04* (2006.01)

(52) U.S. Cl.
CPC .................................. *B23D 21/04* (2013.01)

(58) Field of Classification Search
CPC .......... B26D 3/162; B26D 21/04; G01B 5/10; B23Q 17/2266; B23Q 17/2275; B23B 25/065; B23B 5/162; B23D 21/04
USPC .......................................... 83/54, 34; 266/56
See application file for complete search history.

(56) References Cited

U.S. PATENT DOCUMENTS

| | | | |
|---|---|---|---|
| 1,140,208 A | 5/1915 | Taylor | |
| 1,301,759 A | 4/1919 | Stewart | |
| 1,698,154 A * | 1/1929 | Day | B25H 7/00 |
| | | | 33/21.3 |
| 1,852,412 A * | 4/1932 | Hickey | B23K 7/006 |
| | | | 33/21.3 |
| 1,886,082 A | 11/1932 | Chapman | |
| 1,902,616 A * | 3/1933 | Brungardt | B23D 21/04 |
| | | | 82/60 |
| 2,358,741 A | 9/1944 | Shelby | |
| 2,364,963 A | 12/1944 | Elliott | |

(Continued)

FOREIGN PATENT DOCUMENTS

| CN | 85102879 | 1/1986 |
|---|---|---|
| CN | 87101953 | 9/1988 |

(Continued)

OTHER PUBLICATIONS

English Machine Translation of DE900042.

(Continued)

*Primary Examiner* — Ghassem Alie
*Assistant Examiner* — Samuel A Davies
(74) *Attorney, Agent, or Firm* — Klintworth & Rozenblat LLP

(57) ABSTRACT

A positioning assembly is provided to position a pipe machining apparatus on a pipe so that a miter cut can be performed. The pipe machining apparatus includes a frame, a tool carrier rotatably mounted to the frame, wherein the frame and tool carrier define a longitudinal central axis, a plurality of couplers equally spaced around the frame and coupled to the frame, each coupler being configured to be moved radially relative to the frame and the tool carrier to engage a surface of the pipe and further being configured to move the frame and the tool carrier parallel to the longitudinal central axis, and a scale on the tool carrier, the scale being configured to display the distance between the frame and tool carrier and the surface of the pipe. The method of using same is provided.

19 Claims, 12 Drawing Sheets

(56) References Cited

U.S. PATENT DOCUMENTS

| | | | |
|---|---|---|---|
| 2,408,517 A | 10/1946 | Howard | |
| 2,635,270 A | 4/1953 | Dawson | |
| 2,798,390 A | 7/1957 | Bennett | |
| 2,800,867 A * | 7/1957 | Smith | B23K 37/0533 |
| | | | 269/189 |
| 2,911,239 A | 11/1959 | Marzolf, Sr. | |
| 2,931,659 A | 4/1960 | Novkov | |
| 2,968,375 A | 1/1961 | Avery, Sr. | |
| 3,253,336 A | 5/1966 | Brown | |
| 3,431,646 A | 3/1969 | Young | |
| 3,651,569 A | 3/1972 | Arnot | |
| 3,732,758 A | 5/1973 | Rinaldo | |
| 3,942,248 A | 3/1976 | Sherer et al. | |
| 4,007,705 A * | 2/1977 | Sherer | B05B 13/0436 |
| | | | 118/710 |
| 4,051,342 A * | 9/1977 | Stubbings | B23K 9/0286 |
| | | | 219/137 R |
| 4,112,794 A | 9/1978 | Franks et al. | |
| 4,289,430 A | 9/1981 | Shashaty | |
| 4,318,391 A | 3/1982 | Wachs et al. | |
| 4,366,994 A | 1/1983 | Yoshioka | |
| 4,397,487 A | 8/1983 | Guttman | |
| 4,411,178 A | 10/1983 | Wachs et al. | |
| 4,421,441 A | 12/1983 | Hirose | |
| 4,483,223 A | 11/1984 | Nall et al. | |
| 4,490,909 A | 1/1985 | Wachs et al. | |
| 4,493,150 A | 1/1985 | Garcia et al. | |
| 4,543,861 A | 10/1985 | Kwech et al. | |
| 4,608,755 A | 9/1986 | Braasch | |
| 4,637,285 A | 1/1987 | Mizoguchi | |
| 4,655,108 A | 4/1987 | Galos | |
| 4,677,884 A | 7/1987 | Kwech et al. | |
| 4,716,271 A | 12/1987 | Hulsizer et al. | |
| 4,739,685 A | 4/1988 | Ricci | |
| 4,754,672 A | 7/1988 | VanderPol | |
| 4,762,038 A | 8/1988 | Olson | |
| 4,770,074 A | 9/1988 | Kwech | |
| 4,791,842 A | 12/1988 | Olson | |
| 4,813,314 A | 3/1989 | Kwech | |
| 4,824,301 A * | 4/1989 | Martin | B23B 5/162 |
| | | | 82/113 |
| 4,829,860 A | 5/1989 | VanderPol | |
| 4,880,340 A | 11/1989 | Taki et al. | |
| 4,939,964 A | 7/1990 | Ricci | |
| 5,002,440 A | 3/1991 | Tamaoki et al. | |
| 5,013,015 A | 5/1991 | Fatheree | |
| 5,050,291 A | 9/1991 | Gilmore | |
| 5,054,342 A | 10/1991 | Swiatowy et al. | |
| 5,070,600 A | 12/1991 | Brew et al. | |
| 5,117,551 A | 6/1992 | Roman et al. | |
| 5,199,928 A | 4/1993 | Gress et al. | |
| 5,361,659 A | 11/1994 | Hanson | |
| 5,368,399 A | 11/1994 | Tremblay | |
| 5,549,024 A | 8/1996 | Ricci | |
| 5,603,250 A | 2/1997 | Robinson | |
| 5,609,081 A | 3/1997 | Lin | |
| 5,775,188 A | 7/1998 | Strait | |
| 5,875,699 A | 3/1999 | Koelsch | |
| 5,894,772 A | 4/1999 | Nodar | |
| 5,941,145 A | 8/1999 | Marshall et al. | |
| 5,943,927 A | 8/1999 | Hanson et al. | |
| 5,954,462 A | 9/1999 | Way et al. | |
| 6,065,378 A | 5/2000 | Ricci | |
| 6,227,577 B1 | 5/2001 | Ikeda et al. | |
| 6,257,110 B1 | 7/2001 | Ricci et al. | |
| 6,615,696 B2 | 9/2003 | Ricci et al. | |
| 6,901,828 B2 * | 6/2005 | Ricci | B23B 5/08 |
| | | | 82/128 |
| 6,996,914 B1 * | 2/2006 | Istre | G01B 11/12 |
| | | | 33/645 |
| 7,000,510 B1 * | 2/2006 | Place | B23B 5/163 |
| | | | 82/113 |
| 7,383,758 B2 | 6/2008 | Place et al. | |
| 7,793,574 B2 | 9/2010 | Sorensen et al. | |
| 8,434,392 B1 * | 5/2013 | Lerner | G01B 21/14 |
| | | | 82/1.11 |
| 8,534,170 B2 | 9/2013 | Arnemann | |
| 9,050,669 B2 | 6/2015 | Coakley | |
| 10,208,876 B2 | 2/2019 | Dehais et al. | |
| 10,434,584 B2 | 10/2019 | Coakley | |
| 10,710,177 B2 | 7/2020 | Coakley | |
| 2004/0035171 A1 | 2/2004 | Gormany | |
| 2004/0234352 A1 | 11/2004 | Vanderpol et al. | |
| 2005/0132851 A1 | 6/2005 | Place | |
| 2005/0180830 A1 * | 8/2005 | Tieszen | B23Q 17/22 |
| | | | 409/218 |
| 2006/0207395 A1 | 9/2006 | Place et al. | |
| 2009/0191040 A1 | 7/2009 | Liu et al. | |
| 2010/0062887 A1 | 3/2010 | Bodensteiner et al. | |
| 2010/0162860 A1 | 7/2010 | Hall et al. | |
| 2011/0219920 A1 | 9/2011 | Arnemann | |
| 2011/0290091 A1 * | 12/2011 | Clark, II | E02D 9/005 |
| | | | 83/184 |
| 2013/0152748 A1 * | 6/2013 | Wokan | B23B 5/162 |
| | | | 82/113 |
| 2014/0096398 A1 | 4/2014 | Coakley | |
| 2014/0190327 A1 | 7/2014 | Pierce et al. | |
| 2014/0191460 A1 * | 7/2014 | Pierce | B23B 5/161 |
| | | | 269/287 |
| 2017/0043417 A1 | 2/2017 | Coakley | |
| 2018/0056408 A1 * | 3/2018 | Coakley | B23B 3/265 |
| 2019/0160604 A1 * | 5/2019 | Weinberg | B26D 3/166 |
| 2019/0381621 A1 | 12/2019 | Coakley | |
| 2020/0254589 A1 * | 8/2020 | Roberts | B25B 27/16 |

FOREIGN PATENT DOCUMENTS

| | | |
|---|---|---|
| CN | 2109276 U | 7/1992 |
| CN | 2254385 Y | 5/1997 |
| CN | 2274107 Y | 2/1998 |
| CN | 1424155 A | 6/2003 |
| CN | 2761329 | 3/2006 |
| CN | 101132890 A | 2/2008 |
| CN | 201482987 | 5/2010 |
| CN | 103100749 A | 5/2013 |
| CN | 103846326 A | 6/2014 |
| CN | 104858681 A | 8/2015 |
| DE | 900042 C | 12/1953 |
| DE | 2439852 A1 | 3/1976 |
| DE | 3603618 | 10/1987 |
| DE | 4240637 | 6/1994 |
| DE | 10020393 | 2/2001 |
| DE | 102009005983 | 7/2010 |
| EP | 0491724 B1 | 1/1994 |
| EP | 0733425 A2 | 9/1996 |
| EP | 0819501 A1 | 1/1998 |
| FR | 2641487 A1 | 7/1990 |
| FR | 3016020 | 7/2015 |
| GB | 2242850 A | 10/1991 |
| WO | WO9103345 A1 | 3/1991 |
| WO | 2010/077349 | 7/2010 |
| WO | 2010/085621 | 7/2010 |
| WO | 2012/071419 | 5/2012 |
| WO | 2014/055610 | 4/2014 |
| WO | 2014/109910 | 7/2014 |

OTHER PUBLICATIONS

HST2121, "H&S Tool Clamshell.mpg," Dec. 22, 2009, Published on YouTube, https://www.youtube.com/watch?v=Okfh-ODTj-8.
https://www.amazon.com/dp/B018FWF7X4?tag=architecture_lab-20&linkCode=ogi&th=1&psc=1.
https://us.misumi-ec.com/vona2/detail/223006661826/.
English Machine Translation of CN1424155.
English Machine Translation of CN2109276.
English Machine Translation of CN201482987.
English Machine Translation of CN2254385.
English Machine Translation of CN2274107.
English Machine Translation of DE2439852.
English Machine Translation of CN87101953.
English Machine Translation of CN2761329.

(56) References Cited

OTHER PUBLICATIONS

English Machine Translation of CN85102879.
English Machine Translation of DE3603618.
English Machine Translation of DE4240637.
English Machine Translation of DE10020393.

* cited by examiner

US 12,358,062 B2

ASSEMBLY FOR POSITIONING PIPE MACHINING APPARATUS FOR MITER CUTTING

FIELD OF THE INVENTION

The present disclosure generally relates to an assembly for accurately positioning a pipe machining apparatus to enable a miter cut to be effected on a pipe.

BACKGROUND

A variety of different types of pipe machining apparatuses exist to perform various machining processes on pipes. One such process includes cutting pipes. Such pipes may be cut to remove a damaged or worn pipe portion and to facilitate a replacement pipe portion to be coupled in place of the removed pipe portion. A variety of positioning apparatuses have been provided to accurately position the pipe machining apparatus on the pipe. Some positioning apparatus are adjusted manually be hand, while other are automated.

SUMMARY

The present disclosure is defined by the following claims, and nothing in this section should be taken as a limitation on those claims.

In one aspect, a positioning assembly is provided to position a pipe machining apparatus on a pipe so that a miter cut can be performed. The pipe machining apparatus includes a frame, and a tool carrier rotatably mounted to the frame. The frame and tool carrier define a longitudinal central axis. The positioning assembly includes a plurality of couplers equally spaced around the frame and coupled to the frame, each coupler being configured to be moved radially relative to the frame and the tool carrier to engage a surface of the pipe and further being configured to move the frame and the tool carrier parallel to the longitudinal central axis, and a scale on the tool carrier, the scale being configured to display the distance between the frame and tool carrier and the surface of the pipe.

In another aspect, a method of using such a positioning assembly is provided. The method includes mounting the pipe machining apparatus onto the pipe; adjusting each coupler to move the couplers radially into engagement with a surface of the pipe; rotating the tool carrier to align the scale with a first indicia which indicates where a miter cut is to be cut on the pipe; adjusting one or more of the couplers to move the frame and tool carrier parallel to the longitudinal central axis until the scale is aligned with the first indicia; rotating the tool carrier to align the scale with a second indicia which indicates where the miter cut is to be cut on the pipe, the second indicia being spaced from the first indicia; adjusting one or more of the couplers to move the frame and tool carrier parallel to the longitudinal central axis until the scale is aligned with the second indicia; rotating the tool carrier to align the scale with a third indicia which indicates where the miter cut is to be cut on the pipe, the third indicia being spaced from the first indicia and spaced from the second indicia; adjusting one or more of the couplers to move the frame and tool carrier parallel to the longitudinal central axis until the scale is aligned with the third indicia; rotating the tool carrier to align the scale with the first coupler; using the scale to determine a distance the frame and tool carrier are positioned relative to the pipe at the first coupler; rotating the tool carrier to align the scale with the third coupler, the third coupler being diametrically opposed to the first coupler; using the scale to determine a distance the frame and tool carrier are positioned relative to the pipe at the third coupler; radially adjusting the first and third couplers until the first and third couplers are equally spaced from the pipe; rotating the tool carrier to align the scale with the second coupler; using the scale to determine a distance the frame and tool carrier are positioned relative to the pipe at the second coupler; rotating the tool carrier to align the scale with the fourth coupler, the fourth coupler being diametrically opposed to the second coupler; using the scale to determine a distance the frame and tool carrier are positioned relative to the pipe at the fourth coupler; and radially adjusting the second and fourth couplers until the second and fourth couplers are equally spaced from the pipe.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
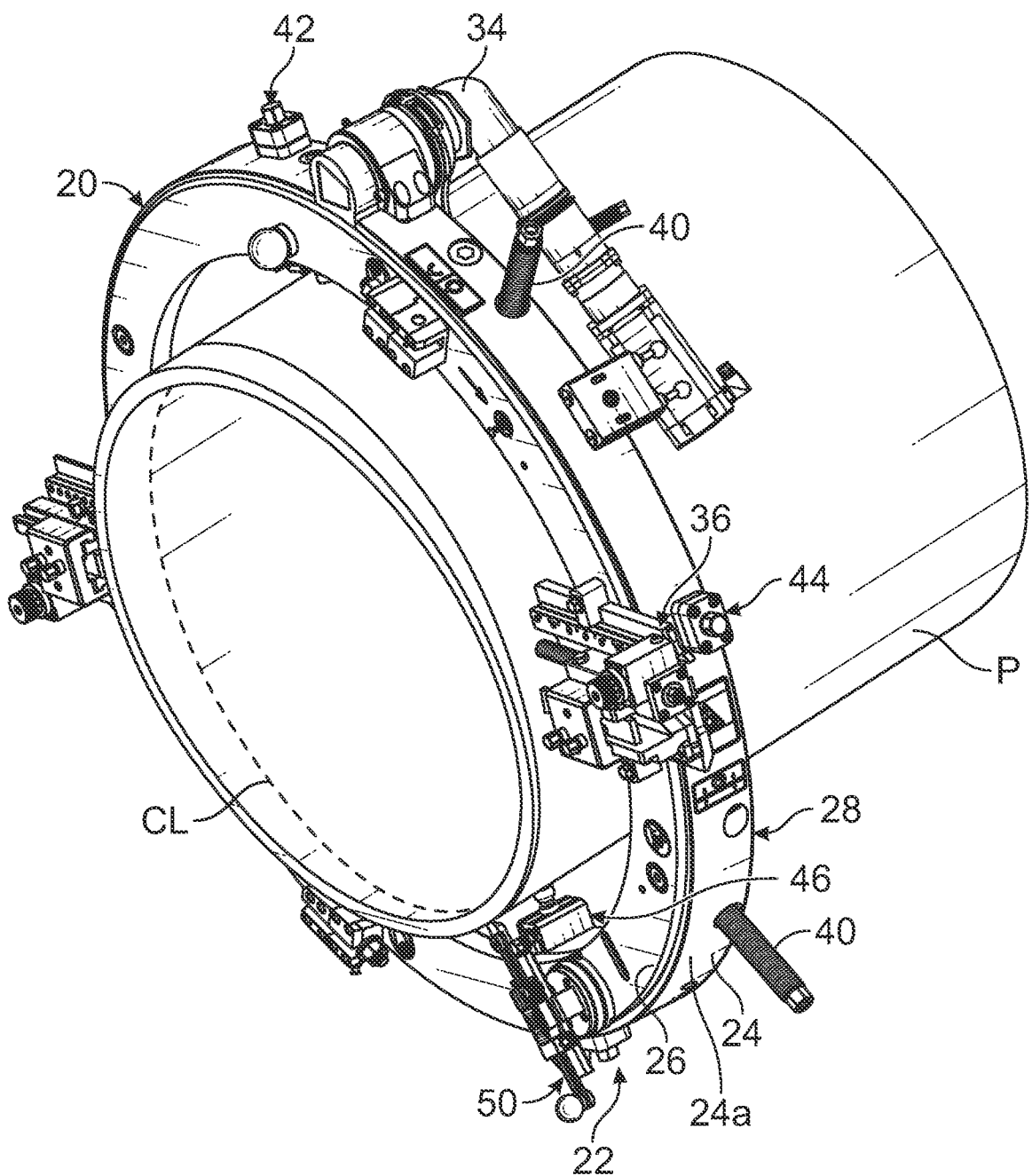
FIG. 1 is a front perspective view of one example of a pipe machining apparatus coupled to one example of a pipe, with the pipe machining apparatus including one example of a positioning apparatus, and one example of a pipe machining apparatus.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

With reference to FIG. 1, a pipe machining apparatus 20 which is used to machine a pipe P includes a positioning assembly 22 which is used to properly position the pipe machining apparatus 20 on the pipe P to perform a miter cutting operation on the pipe P. The pipe P has a longitudinal central axis PA, as shown in FIGS. 2-5, which extends along its length. The positioning assembly 22 positions the pipe machining apparatus 20 relative to at least one previously marked indicia on the pipe P which indicate the cut line CL around the circumference of the pipe P. As shown, the cut line CL does not form a circular cut in cross-section; instead, an elliptical cut is formed in cross-section.

With reference to the drawings, one example of the pipe machining apparatus 20 adapted to machine pipes P of varying diameters is illustrated. The present pipe machining apparatus 20 is provided to demonstrate principles of the present disclosure and is not intended to be limiting. In the illustrated exemplary embodiment, the pipe machining apparatus 20 is formed of two joined-together semicircular frame sections which form a circular frame 24 and two joined-together semicircular tool carrier sections which form a circular tool carrier 26. In another example, the frame 24 may be comprised of a single, unitary member, and the tool carrier 26 may be formed of two sections or a single unitary section. The frame 24 is adapted to be coupled to and to be fixed relative to the pipe P, and the tool carrier 26 is mounted on the frame 24 and is rotatable relative to the fixed frame 24 and to the pipe P. The coupled frame 24 and tool carrier 26 define a mounting assembly 28. The mounting assembly 28 defines a central cavity 30 and a longitudinal central axis 32. A drive motor 34 is adapted to rotate the tool carrier 26 relative to the frame 24 through suitable means around the longitudinal central axis 32. The rotatable tool carrier 26 includes one or more tool supports 36 (two tool supports 36 are shown in the illustrated exemplary embodiment), which support tools 38 for performing the cutting on the pipe P as the tools 38 rotate about the pipe P around the longitudinal central axis 32 under action of the drive motor 34.

The pipe machining apparatus 20 further includes four adjustable spaced apart clamps 40 engageable with a surface of the pipe P and having suitable adjustability to finally couple the pipe machining apparatus 20 to the pipe P as described herein. The adjustable clamps 40 may be rotatable screws having feet thereon that extend through the frame 24 and into the cavity 30.

The positioning assembly 22 includes four couplers 42, 44, 46, 48 coupled to the frame 24, and a scale 50 coupled to the tool carrier 26. The couplers 42, 44, 46, 48 are equal-distance spaced apart from each other such that couplers 42, 46 are diametrically opposed to each other and couplers 44, 48 are diametrically opposed to each other. Each coupler 42, 44, 46, 48 is identical in structure and function. The couplers 42, 44, 46, 48 are offset from the clamps 40.

With reference to FIGS. 6-9, each coupler 42, 44, 46, 48 has a first housing 52 on the frame 24, a first coupling member 54 rotatably attached to the first housing 52, a second housing 56 threadedly attached to the first coupling member 54, a third housing 58 slidably attached to the second housing 56, and a second coupling member 60 rotatably attached to the second housing 56 and to the third housing 58. Rotation of the first coupling member 54 causes radial movement of the second and third housings 56, 58 and the second coupling member 60. Rotation of the second coupling member 60 causes movement of the frame 24 and the tool carrier 26 relative to the third housing 58. The first housing 52 may be integrally formed as part of the frame 24.

The first housing 52 may be formed as a block, and has an unthreaded passageway 62 that extends from an exterior surface 52a thereof to the interior surface 52b thereof. The interior surface 52b of the first housing 52 is fixedly coupled to an exterior surface 24a of the frame 24, and may be coupled thereto by fasteners 64.

The first coupling member 54 may take the form of a screw having a head 66 at an end of a threaded shank 68. The head 66 includes a plurality of flats 70 which can be engaged by a driver 72. The shank 68 extends through the passageway 62 and the head 66 is proximate to the exterior surface 52a of the first housing 52. The threads on the shank 68 are not threadedly engaged with the wall forming the passageway 62. The first coupling member 54 is rotatable relative to the first housing 52, but cannot translate relative to the first housing 52. The longitudinal axis of the first coupling member 54 is perpendicular to the longitudinal central axis 32 of the mounting assembly 28.

The second housing 56 includes a block 74 having an exterior surface 74a, an interior surface 74b, side surfaces 74c, 74d extending therebetween, end surfaces 74e, 74f extending therebetween, and an extending portion 76 which extends from the exterior surface 74a of the block 74 to an outer end 76a. The extending portion 76 has a passageway 78 that extends from the outer end 76a toward the block 74. At least a portion of the wall 80 of the passageway 78 is threaded. The threaded shank 68 extends into the passageway 78 and engages with the wall 80. The interior surface 74b of the block 74 is planar, with the exception of a recess 82. The recess 82 has a first semicylindrical wall portion 84 which extends from the interior surface 74b and extends from the end surface 74e, and a second semicylindrical wall portion 86 which extends from the first wall portion 84 to the end surface 74f. A semicylindrical groove 88 is provided in the first wall portion 84 and is proximate to, but spaced from, the end surface 74e. The first wall portion 84 is defined by a radius which is less than a radius defined by the second wall portion 86. The first and second wall portions 84, 86 and the groove 88 are unthreaded.

The exterior surface 74a of the block 74 is planar, with the exception of a pair of cutouts 90, 92 therein, each of which extends from the end surface 74e to the end surface 74f. Each cutout 90, 92 has a first wall surface 94 which is perpendicular to and extends from the exterior surface 74a, and a second wall surface 96 which is perpendicular to and extends from the first wall surface 94 to the respective side surface 74c, 74d.

The third housing 58 includes a block 98 having an exterior surface 98a, an interior surface 98b, side surfaces 98c, 98d extending therebetween, end surfaces 98e, 98f extending therebetween, a foot 100 which extends from the interior surface 98b of the block 98, and a pipe mount 102 in which the foot 100 is pivotally seated. The block 98 has a recess 104 that extends inwardly from the exterior surface 98a and extends between the end surfaces 98e, 98f. The recess 104 has a first portion 106 which extends from the exterior surface 98a, a second portion 108 which extends from the first portion 106, and a third portion 110 which extends from the second portion 108.

The third portion 110 of the recess 104 has a first semicylindrical wall portion 112 which extends from the end surface 98e toward the end surface 98f, and a second semicylindrical wall portion 114 which extends from the first wall portion 112 to the end surface 98f. The first wall portion 112 is defined by a radius which is greater than a radius defined by the second wall portion 114. The first wall portion 112 is unthreaded, and the second wall portion 114 is threaded along at least a portion of its length that extends from the first wall portion 112. The first wall portion 112 has a length which is greater than the length of the first wall portion 84.

The block 74 of the second housing 56 seats with the recess 104 and the extending portion 76 extends outward from the exterior surface 98a of the block 98. The walls 94, 96 of each cutout 90, 92 seat within and engage the first portion 106 of the recess 104, and the side surfaces 74c, 74d seat within and engage the second portion 108 of the recess 104. The third portion 110 of the recess 104 of the block 98 faces the recess 82 in the second housing 56, and overlaps the second curved wall portion 86 of the second housing 56. The first wall portion 112 faces the groove 88. When the second and third housings 56, 58 are coupled together, a passageway 116 is formed therebetween.

The second coupling member 60 seats within the passageway 116 and may take the form of a screw having a head 118 at an end of a threaded shank 120. The head 118 includes a plurality of flats 122 which can be engaged by the driver 72 and a circular flange 124 which extends radially outward from the head 118. When the second coupling member 60 is seated within the passageway 116, the flats 122 extend from the end surface 98e, the flange 124 seats within the groove 88, and the threaded shank 120 seats threadedly engages within the wall portion 114. The longitudinal axis of the second coupling member 60 is parallel to the longitudinal central axis 32 of the mounting assembly 28.

The foot 100 has a ball-shaped end which is pivotally mounted within a recess 126 in the exterior surface 102a of the pipe mount 102. The pipe mount 102 has an interior surface 102b which is configured to engage with the surface of the pipe P. The interior surface 102b may be knurled.

Upon rotation of the first coupling member 54, the second housing 56, the second coupling member 60 and the third housing 58 move relative to the first housing 52 and move radially. Upon rotation of the second coupling member 60, the second coupling member 60 rotates relative to the second housing 56, but does not translate relative to the second housing 56 as a result of the flange 124 within the groove 88. As a result of the threaded engagement of the second coupling member 60 with the third housing 58 and upon rotation of the second coupling member 60, the second coupling member 60, the second housing 56, the first coupling member 54, the first housing 56, the frame 24 and the tool carrier 26 translate parallel to the longitudinal central axis 32 and relative to the third housing 58. The first and second coupling members 54, 60 may be either manually or auto/power actuatable. In some examples, the first and second coupling members 54, 60 are all manually actuatable. In other examples, the first and second coupling members 54, 60 are all auto/power actuatable. In further examples, some of the first and second coupling members 54, 60 are manually actuatable and some of the first and second coupling members 54, 60 are auto/power actuatable. In examples where the first and second coupling members 54, 60 are manually actuatable, an operator engages the first and second coupling members 54, 60 with a hand operated tool which forms the driver 72 and manually rotates the tool. In examples where the first and second coupling members 54, 60 are auto/power actuatable, an operator engages the first and second coupling members 54, 60 with a driven tool which forms the driver 72 and actuates the driven tool. An example of a driven tool is a drill having a socket attachment that couples to the flats 70, 122 of the coupling members 54, 60.

The scale 50 is used to measure the distance between the frame 24 and tool carrier 26 and the surface of the pipe P. Embodiments of the scale 50 are best illustrated in FIGS. 10-14.

Figure 10:
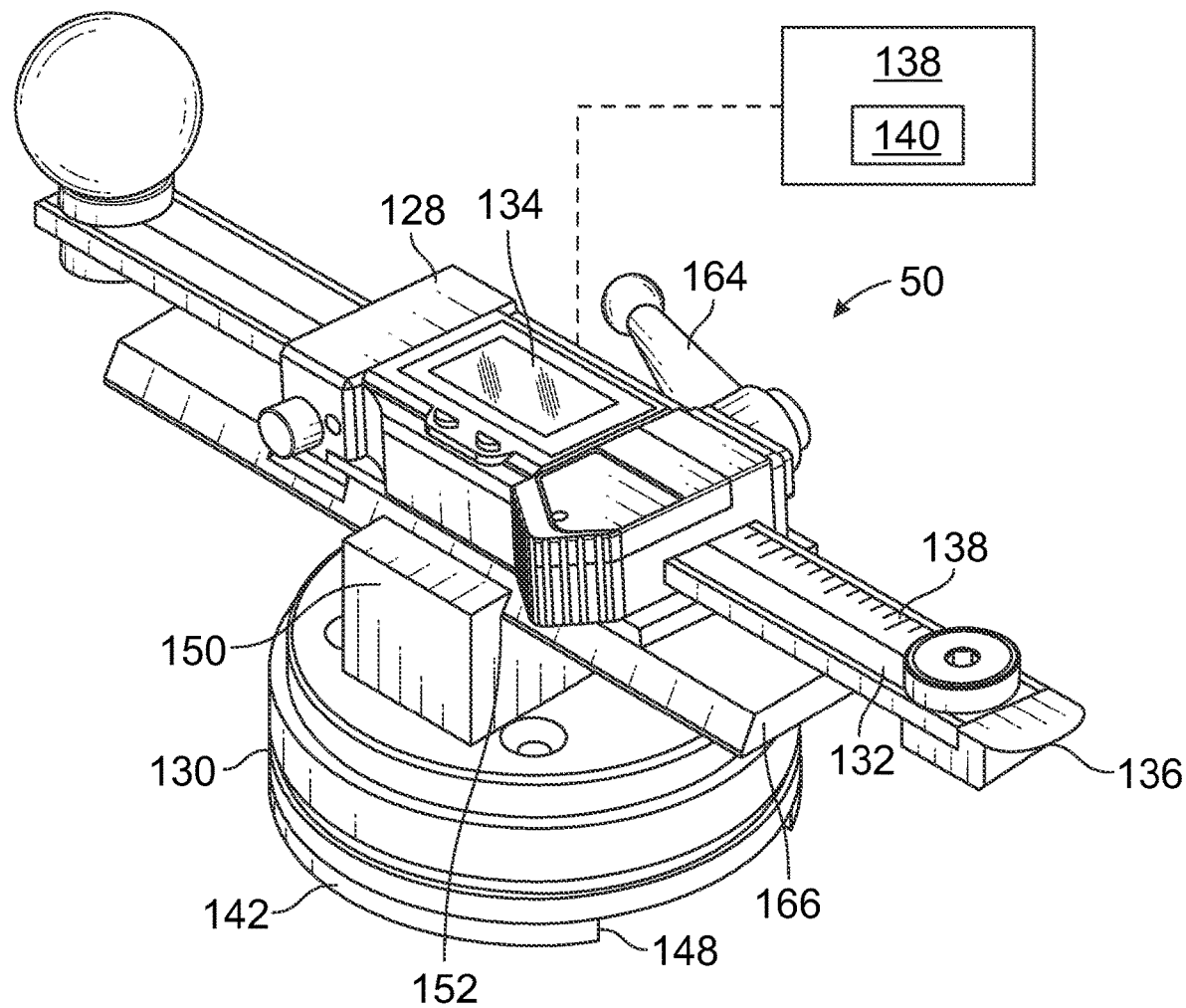
FIG. 10 is a perspective view of an embodiment of a scale of the positioning apparatus.
Figure 11:
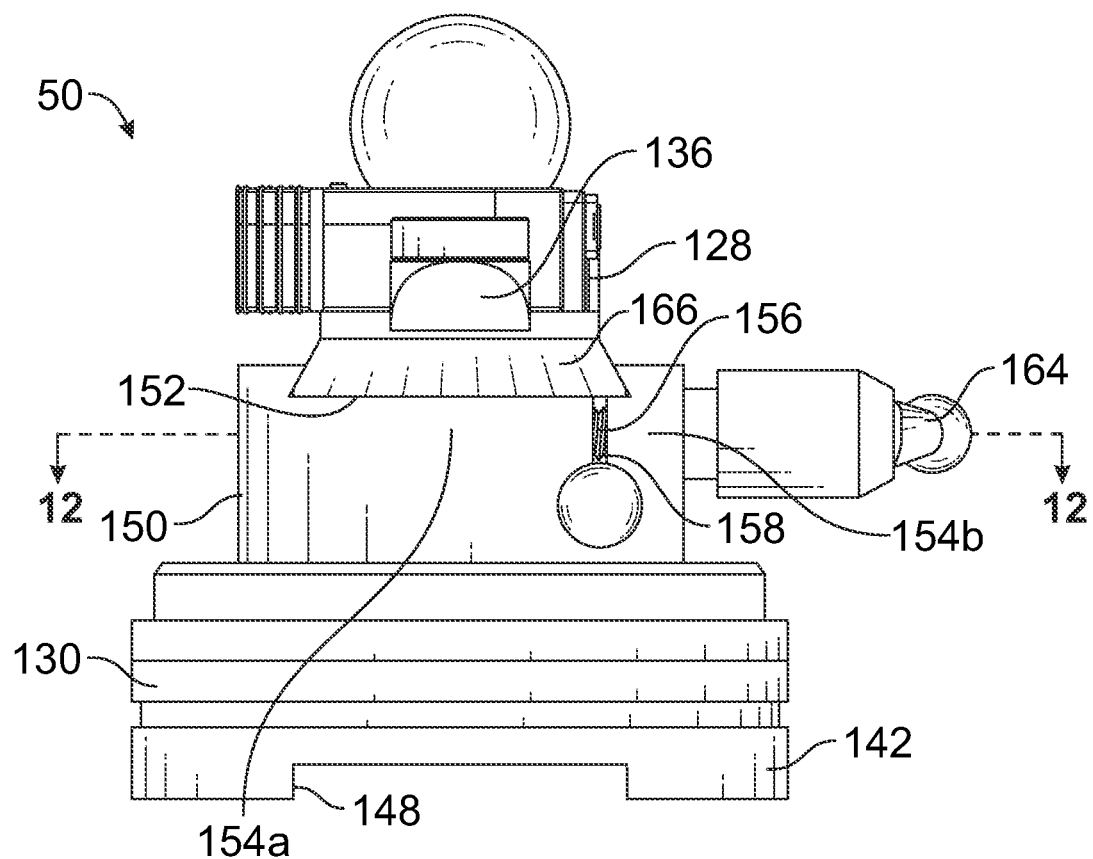
FIG. 11 is an elevation view of the scale of FIG. 10.
Figure 12:
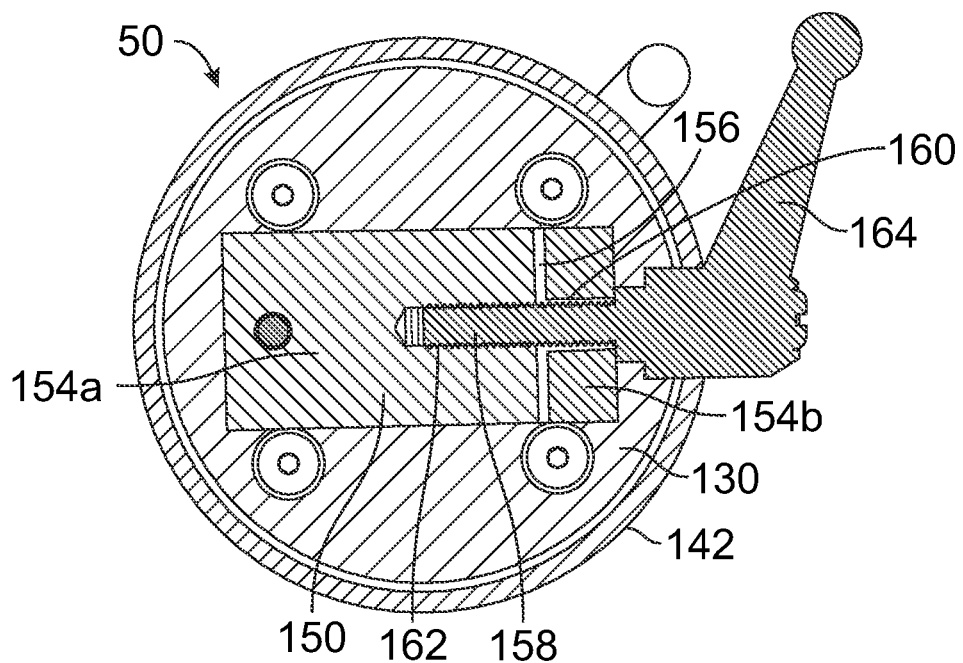
FIG. 12 is a cross-sectional view along line 12-12 of FIG. 7.
Figure 13:
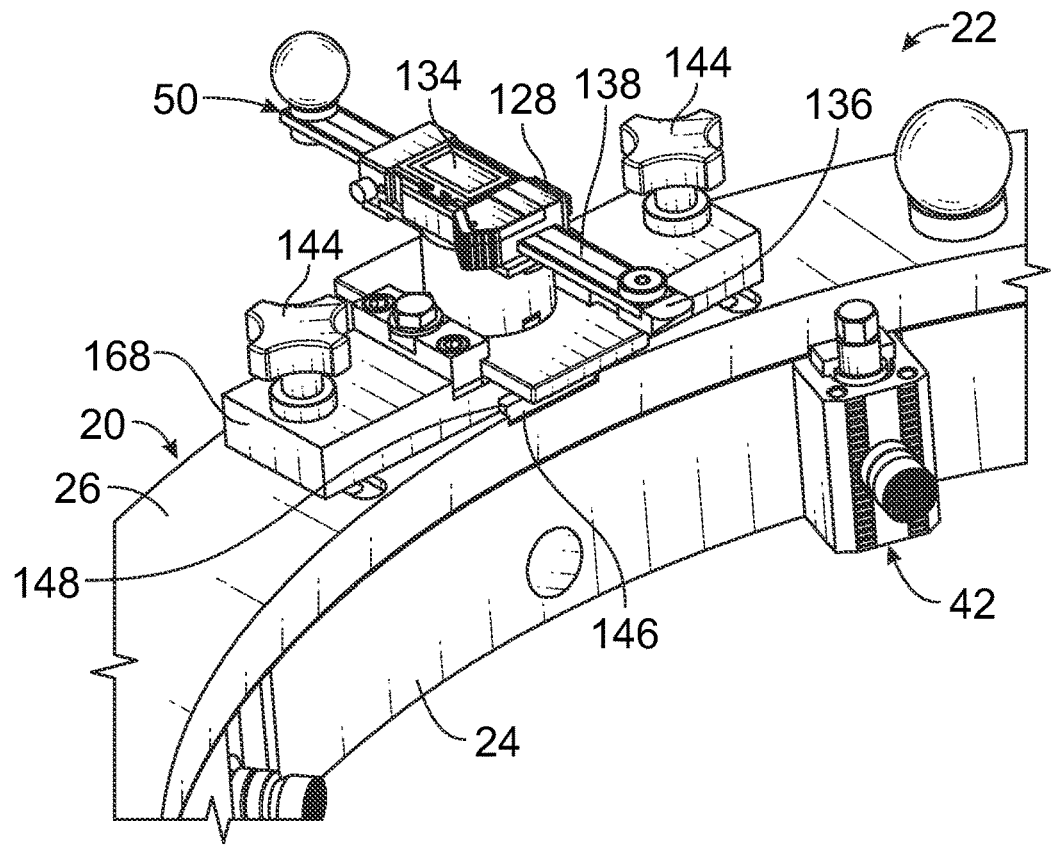
FIG. 13 is a perspective view of another embodiment of a scale of the positioning apparatus.
Figure 14:
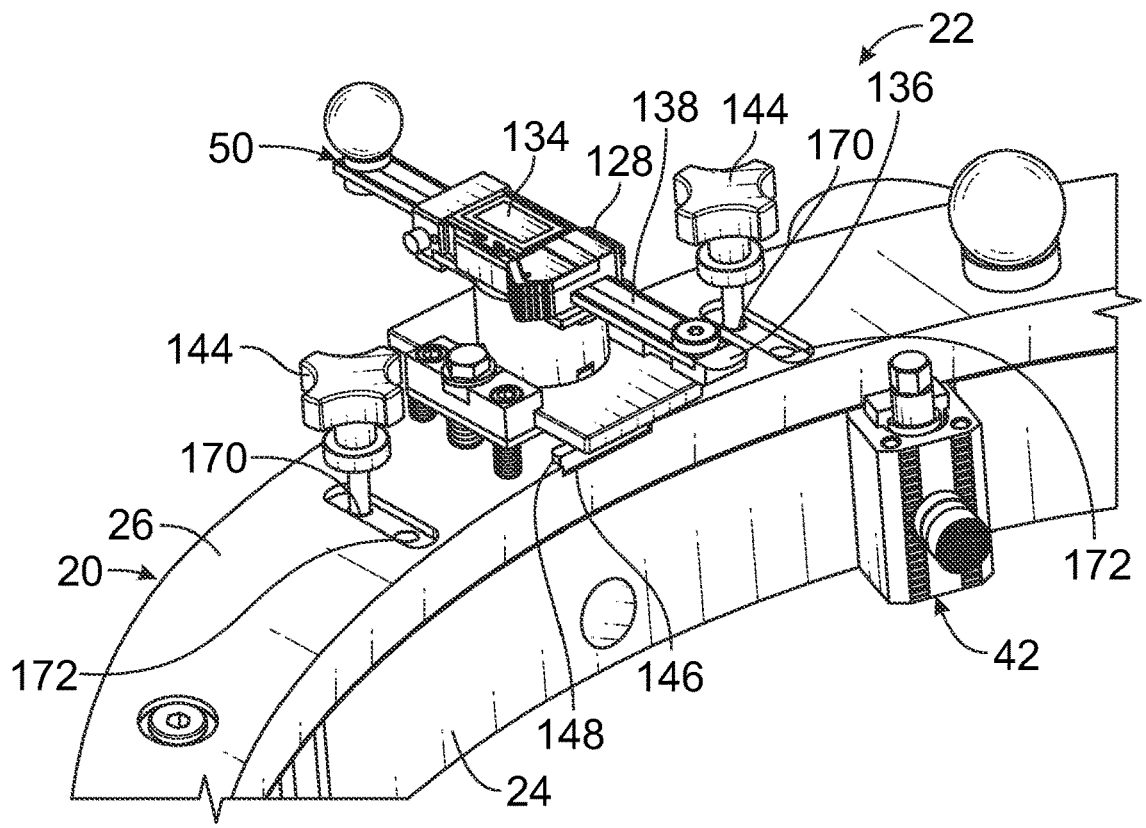
FIG. 14 is a perspective view of the scale of FIG. 3 with a mounting block removed.

In an embodiment, the scale 50 includes a housing 128 attached to the tool carrier 26 by an attachment 130, a rigid arm 132 which extends from the housing 128 and moves radially relative to the frame 24 and the tool carrier 26, and a display 134 which digitally display distances of an end 136 of the arm 132 relative to the housing 128. The arm 132 may have a plurality of visible markings 138 thereon which show the distance. The scale 50 has a processor 138 and circuitry 140 which determines the distance. One example of a such a suitable scale 50 is an ABSOLUTE Digimatic Depth Gauge manufactured by MITUTOYO. The arm 132 can be moved relative to the housing 128 to extend into the central cavity 30 until the end 136 of the arm 132 engages with the surface of the pipe P. The processor 138 and circuitry 140 determines the distance the arm 132 is extended and the distance is digitally displayed on the display 134. If desired, the arm 132 can be spring-loaded. The visible markings 138 provide an analog display of the distance. In another embodiment, the movable arm 132 is replaced by a laser measuring tool having a laser light beam that projects onto the surface of the pipe P. One example of a suitable laser measuring tool is an S9 198 ft Portable Laser Distance Measure manufactured by SUAOKI. In an embodiment as shown in FIGS. 10-12, the attachment 130 on which the housing 128 is mounted has a magnet 142 which magnetically attaches the housing 128 to the tool carrier 26. In an embodiment as shown in FIGS. 13 and 14, the attachment 130 on which the housing 128 is mounted has fasteners 144 which are threaded into the tool carrier 26. Alternatively, the attachment 130 may be permanently affixed to the tool carrier 26, for example, by welding.

In order to ensure that the scale 50 is oriented corrected relative to the tool carrier 26, the tool carrier 26 has a key 146 extending therefrom which seats within a keyway 148 in the attachment 130. Alternatively, the attachment 130 has the key 146 and the tool carrier 26 has the keyway 148.

The housing 128 can be moved relative to the tool carrier 26 in the radial direction of the pipe machining apparatus 20. This provides for an adjustment so that the scale 50 of the positioning assembly 22 can be used with various diameters of pipes P.

In a first embodiment as shown in FIGS. 10-12, the attachment 130 includes a mounting block 150 which has a keyway 152 in a surface thereof on which the housing 128 is mounted. The mounting block 150 is split into a first portion 154a and a second portion 154b which are separated from each other by a recess 156 that extends downward from the keyway 152. A threaded member 158, such as a fastener, extends through an unthreaded passageway 160 in the second portion 154b and is threadedly engaged with a passageway 162 in the first portion 154a. The threaded member 158 has a handle 164 which can be grasped by the operator to move the threaded member 158 relative to the mounting block 150. The housing 128 has a key 166 which is slidably received in the keyway 152. When the handle 164 is generally parallel to the arm 132, the second portion 154b is closer to the first portion 154a and the key 166 is fixed relative to the attachment 130. When the handle 164 is generally angled relative to the arm 132, the threaded member 158 moves outwardly and causes the second portion 154*b* to move away from the first portion 154*a*. This enlarges the width of the keyway 152 and the housing 128 can be slide relative to the attachment 130 in the radial direction. Once the housing 128 is in the desired position relative to the attachment 130, the handle 164 is rotated to cause the second portion 154*b* to be drawn closer to the first portion 154*a* and to lock the key 166 into position within the keyway 152.

In a second embodiment as shown in FIGS. 13 and 14, the attachment 130 includes a mounting block 168 on which the housing 128 is fixedly mounted. The keyway 148 is in the opposite surface of the mounting block 168. The mounting block 168 is attached to the tool carrier 26 by the fasteners 144 that can be threaded into different pairs of openings 170, 172 to move the attachment 130 and the housing 128 radially relative to the tool carrier 26. While two pairs of openings 170, 172 are shown, more than two pairs of openings 170, 172 may be provided to provide for difference distances that the scale 50 can be positioned relative to the pipe P.

In use, the pipe P is marked in a known manner with indicia on the pipe P to indicate the cut line CL around the circumference of the pipe P which shows where the miter cut is to be made. In some instances, three or more marks which are separated from each other are marked on the pipe P in a known manner to show where the miter cut line CL will be. In some instances, a line connecting the marks is created around the pipe P in a known manner to show where the miter cut line CL.

Figure 2:
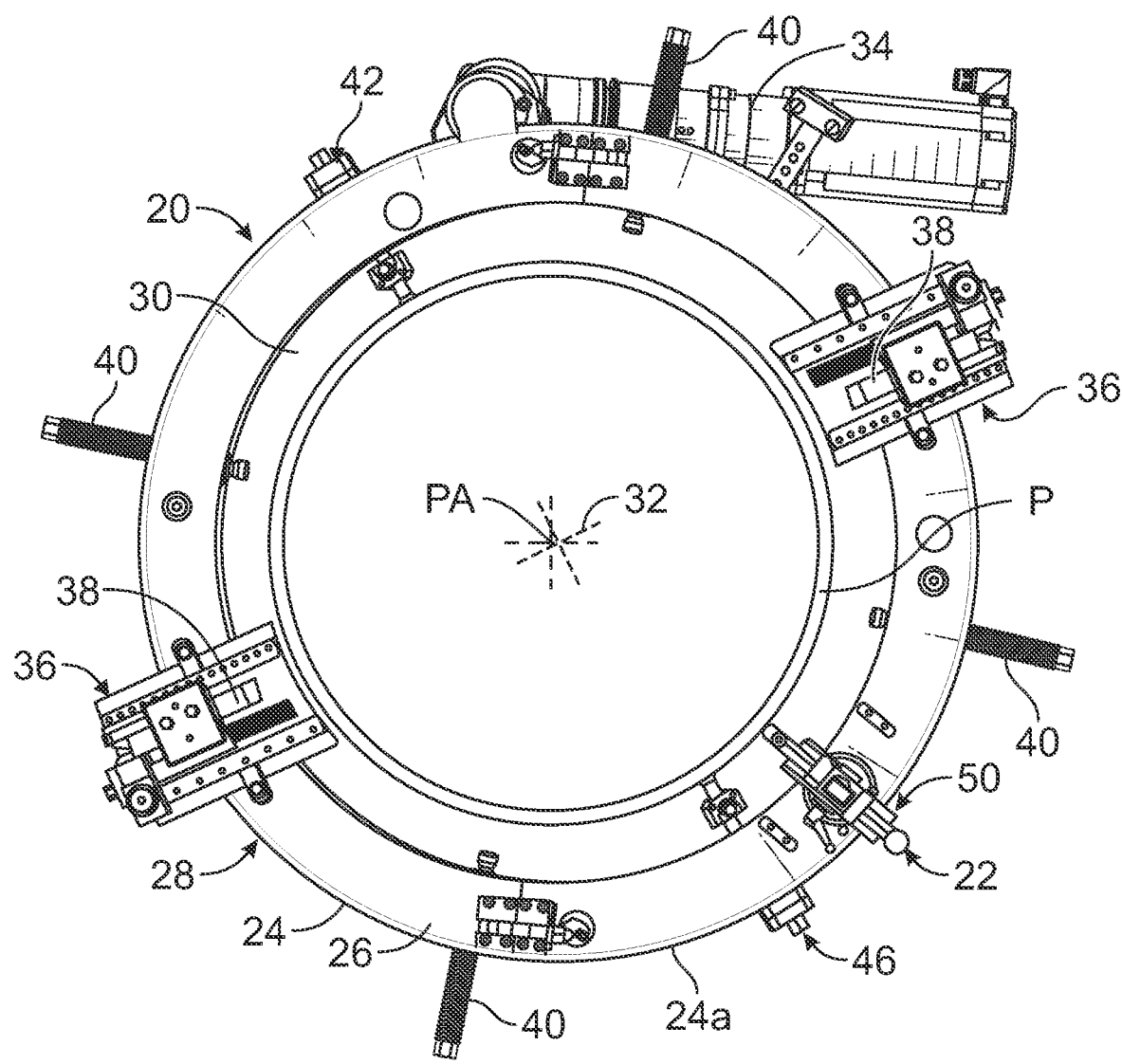
FIG. 2 is a front elevation view of the pipe machining apparatus and positioning apparatus mounted on the pipe in a first position.
Figure 3:
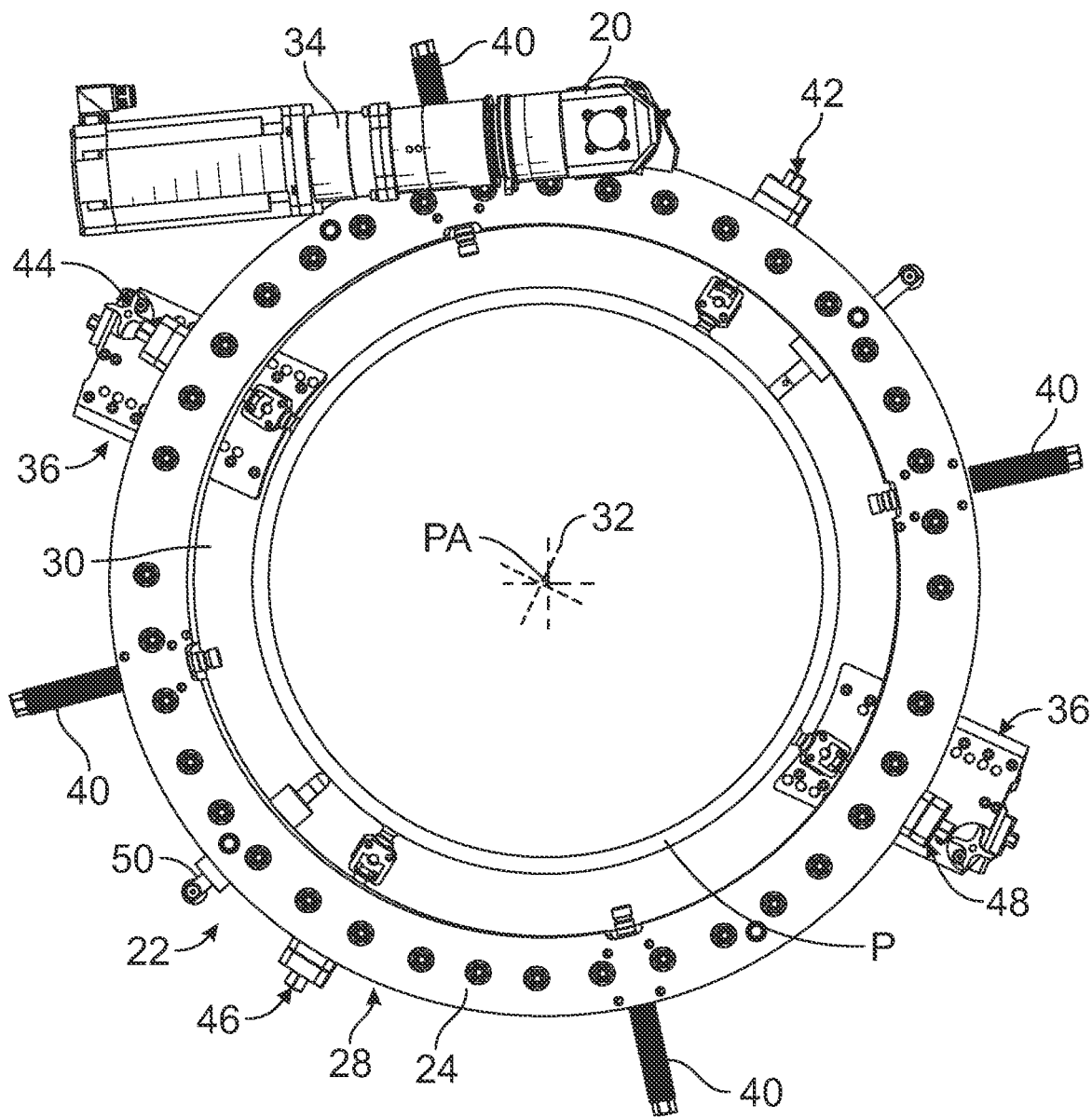
FIG. 3 is a rear elevation view of the pipe machining apparatus and positioning apparatus mounted on the pipe.
Figure 4:
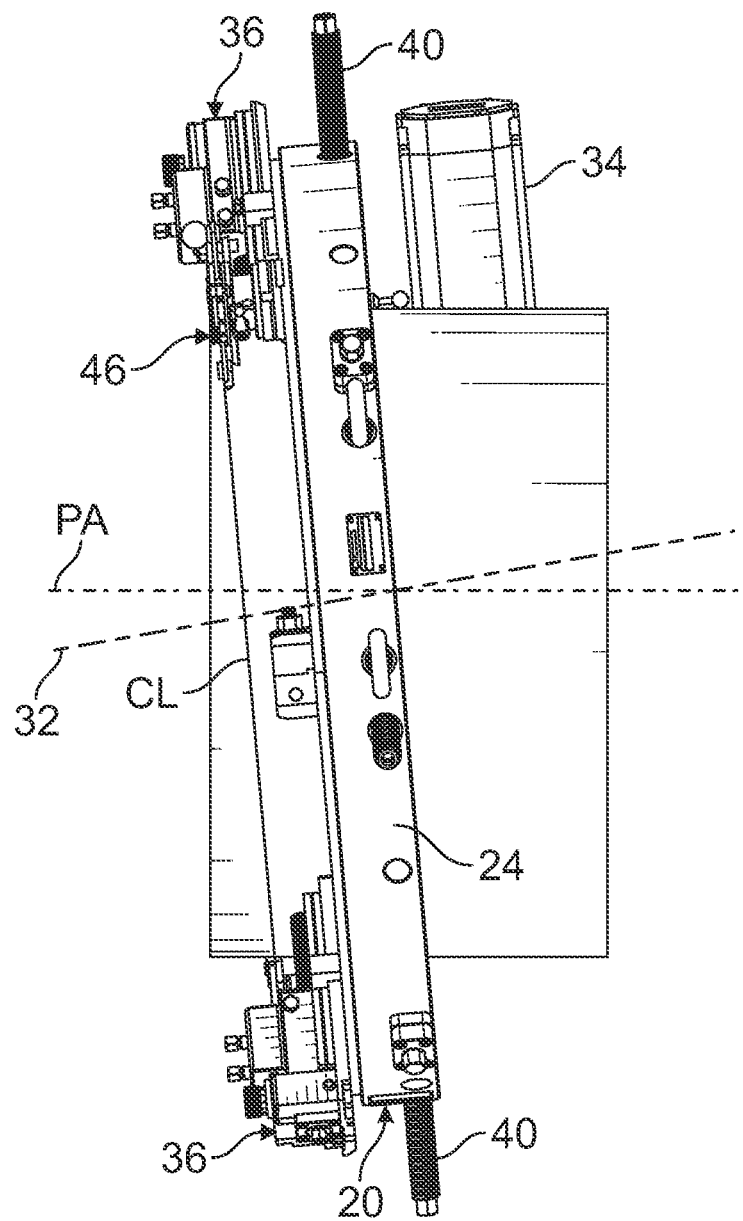
FIG. 4 is a bottom plan view of the pipe machining apparatus and positioning apparatus mounted on the pipe.
Figure 5:
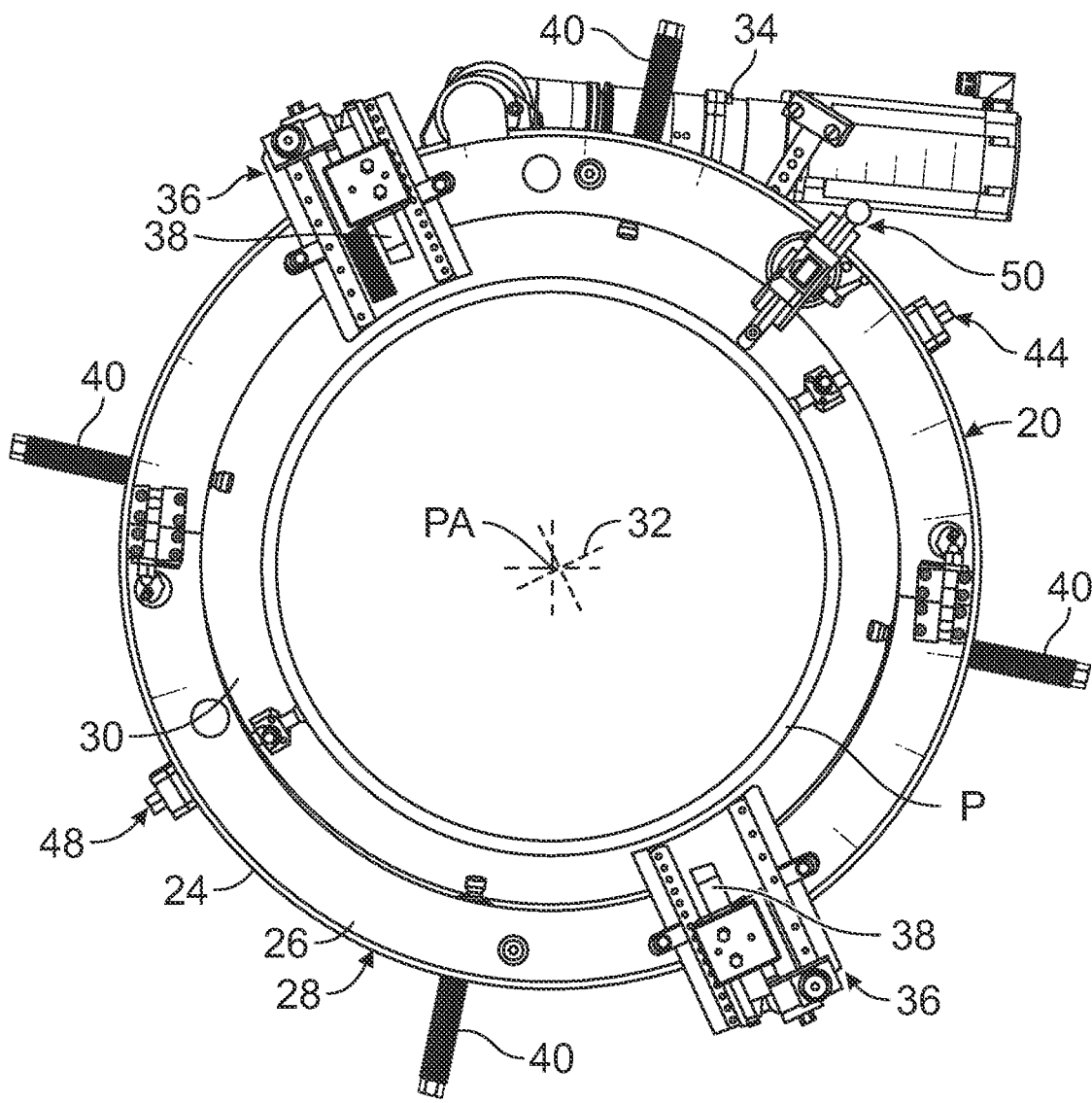
FIG. 5 is a front elevation view of the pipe machining apparatus and positioning apparatus mounted on the pipe in a second position.
Figure 6:
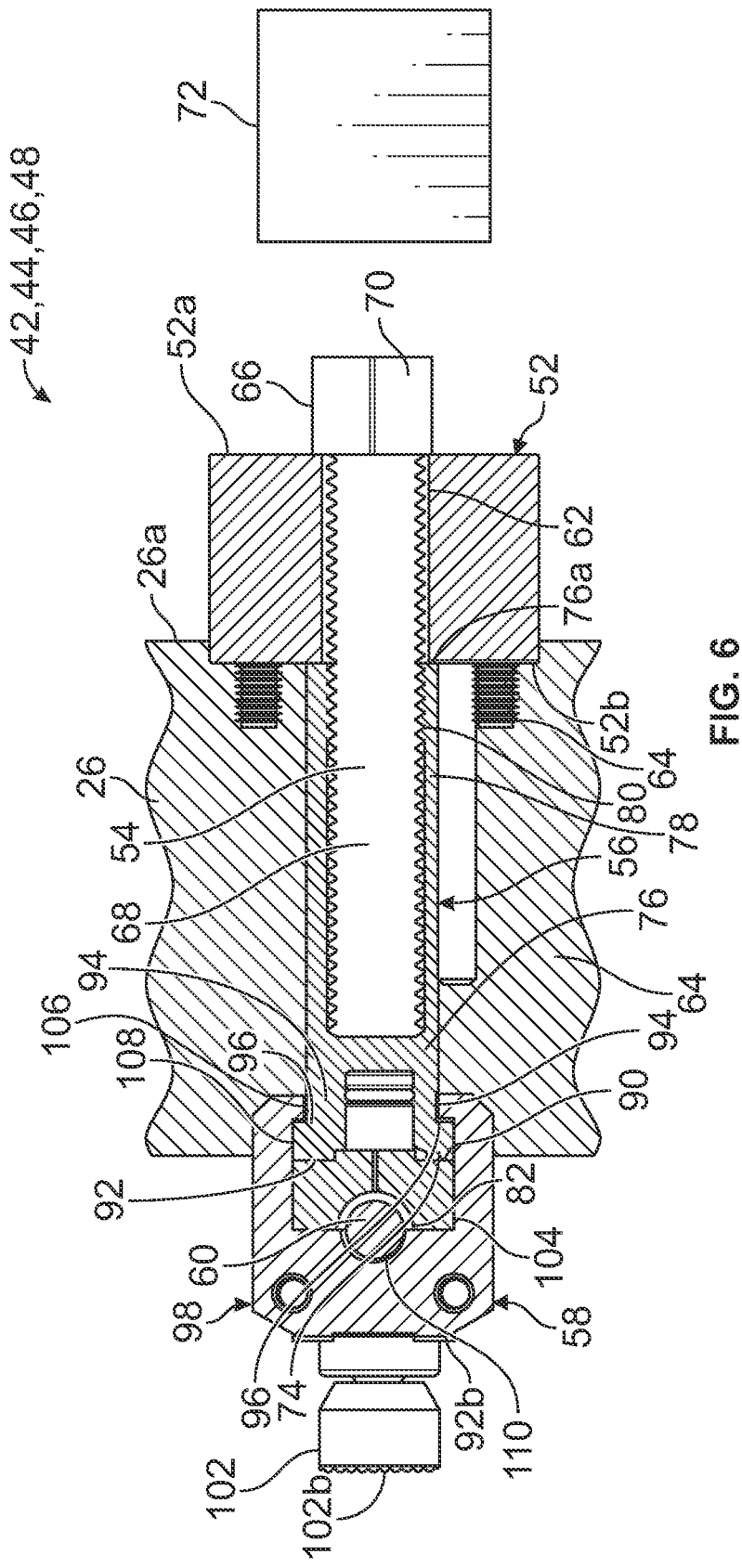
FIG. 6 is a cross-sectional view of the pipe machining apparatus and a component of the positioning apparatus.
Figure 7:
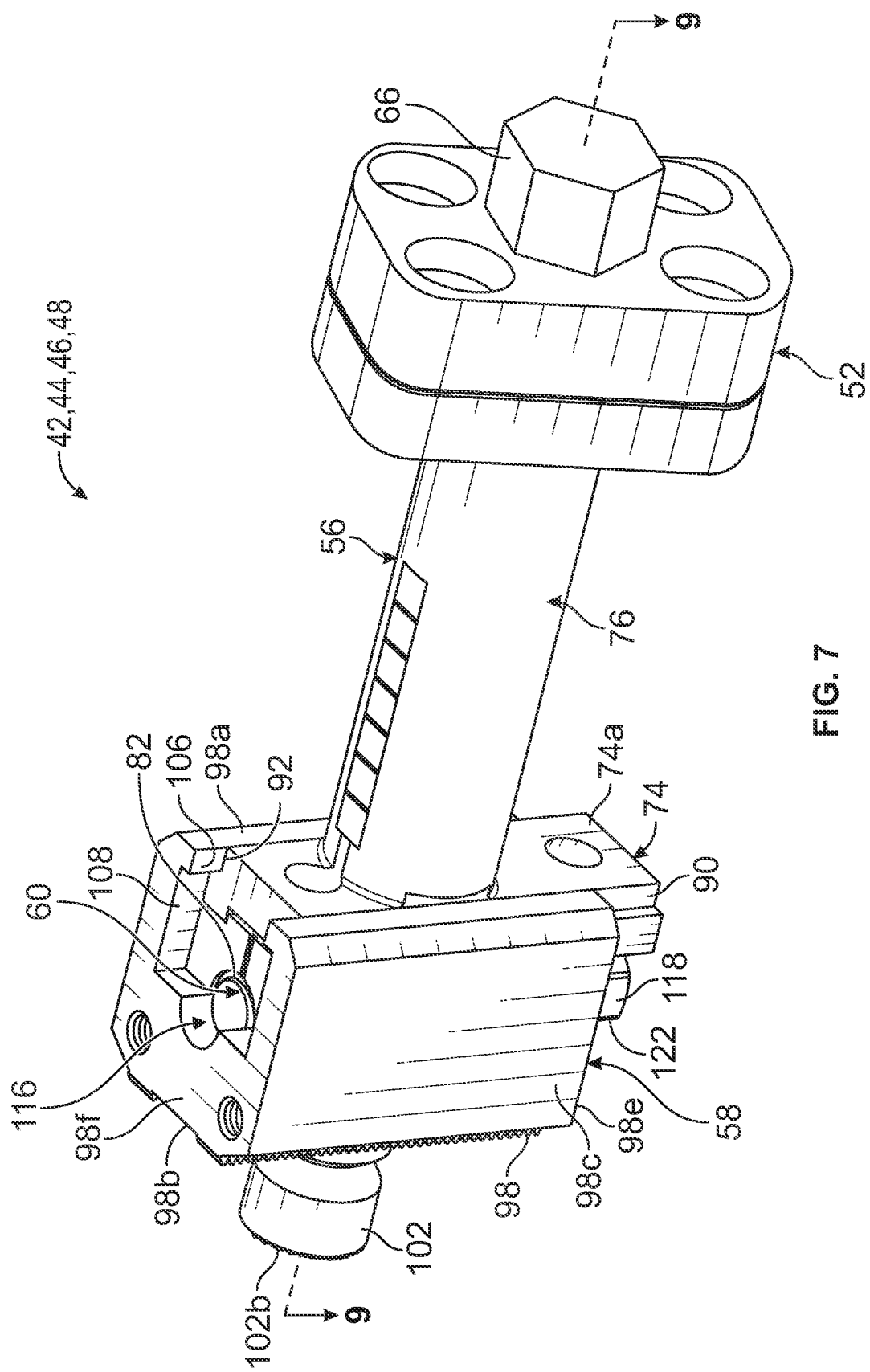
FIG. 7 is a perspective view of a coupler of the positioning apparatus.
Figure 8:
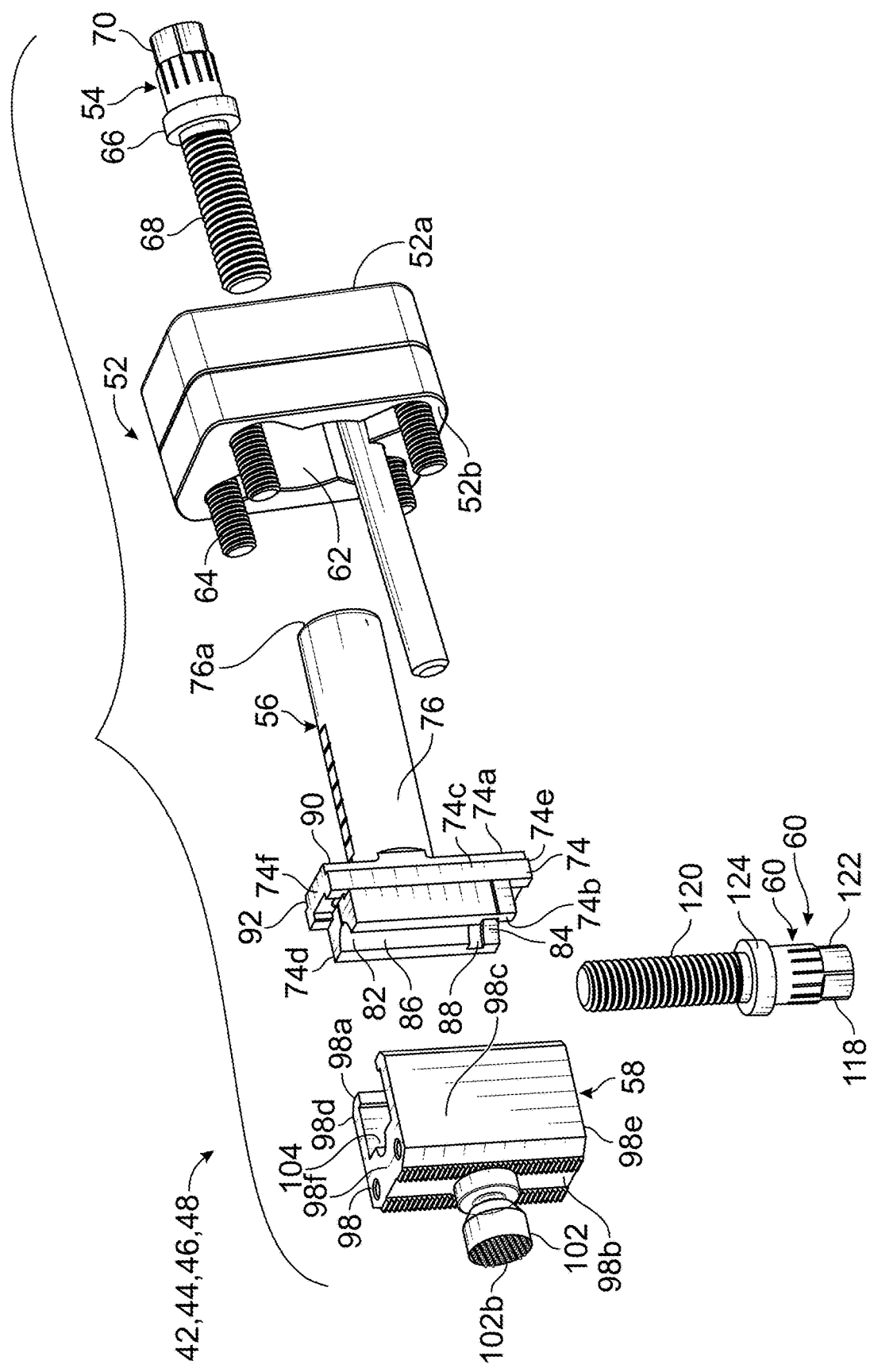
FIG. 8 is an exploded, perspective view of the coupler of FIG. 7.
Figure 9:
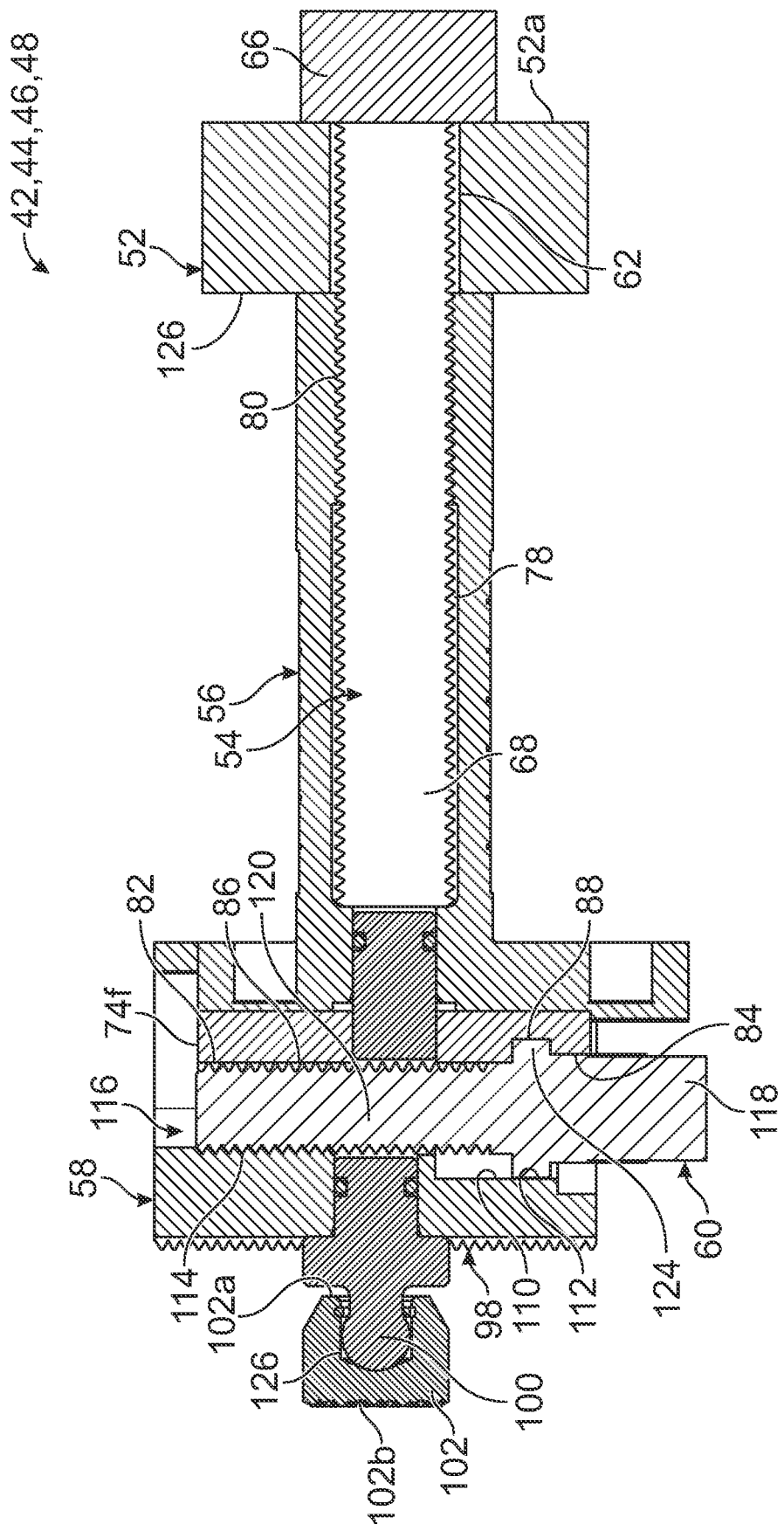
FIG. 9 is a cross-sectional view along line 9-9 of FIG. 7.

In a first method, the line connecting the marks is created around the pipe P. The pipe machining apparatus 20 is positioned on the pipe P proximate to the line with each couplers 42, 44, 46, 48 positioned on the same side of the line. After the pipe machining apparatus 20 is positioned on the pipe P, the first coupling member 54 of each coupler 42, 44, 46, 48 is actuated to move the respective foot 100 and pipe mount 102 radially inward until the pipe mount 102 engages the surface of the pipe P as shown in FIGS. 1-3.

In order to position the pipe machining apparatus 20 in the proper plane, the tool carrier 26 is rotated relative to the frame 24 to longitudinally align the scale 50 with the first coupler 42. The end 136 of the arm 132 is moved into engagement with the surface of the pipe P, or the laser beam is activated to shine onto the surface of the pipe P. If the end 136 of the arm 132 or the light from the laser beam does not align with the portion of the line proximate to the first coupler 42, the second coupling member 60 of the first coupler 42 is actuated to move the frame 24 and the tool carrier 26 parallel to the longitudinal central axis 32 until the end 136 of the arm 132 or the light from the laser beam aligns with the portion of the line proximate to the first coupler 42. The portion of the line proximate to the first coupler 42 forms a first indicia. The pipe mount 102 allows for the foot 100 to pivot to provide for this movement. The tool carrier 26 is then rotated relative to the frame 24 to align the scale 50 with the second coupler 44. The end 136 of the arm 132 is again moved into engagement with the surface of the pipe P, or the laser beam is activated to shine onto the surface of the pipe P. If the end 136 of the arm 132 or the light from the laser beam does not align with the portion of the line proximate to the second coupler 44, the second coupling member 60 of the second coupler 44 is actuated to move the frame 24 and the tool carrier 26 parallel to the longitudinal central axis 32 until the end 136 of the arm 132 or the light from the laser beam aligns with the portion of the line proximate to the second coupler 44. The portion of the line proximate to the second coupler 44 forms a second indicia. The pipe mount 102 allows for the foot 100 to pivot to provide for this movement. The tool carrier 26 is then rotated relative to the frame 24 to align the scale 50 with the third coupler 46. The end 136 of the arm 132 is again moved into engagement with the surface of the pipe P, or the laser beam is activated to shine onto the surface of the pipe P. If the end 136 of the arm 132 or the light from the laser beam does not align with the portion of the line proximate to the third coupler 46, the second coupling member 60 of the third coupler 46 is actuated to move the frame 24 and the tool carrier 26 parallel to the longitudinal central axis 32 until the end 136 of the arm 132 or the light from the laser beam aligns with the portion of the line proximate to the third coupler 46. The portion of the line proximate to the third coupler 46 forms a third indicia. The pipe mount 102 allows for the foot 100 to pivot to provide for this movement. If desired, the tool carrier 26 may then rotated relative to the frame 24 to align the scale 50 with the fourth coupler 48. The tool carrier 26 is then rotated relative to the frame 24 to align the scale 50 with the fourth coupler 48. The end 136 of the arm 132 is again moved into engagement with the surface of the pipe P, or the laser beam is activated to shine onto the surface of the pipe P. If the end 136 of the arm 132 or the light from the laser beam does not align with the portion of the line proximate to the fourth coupler 48, the second coupling member 60 of the fourth coupler 48 is actuated to move the frame 24 and the tool carrier 26 parallel to the longitudinal central axis 32 until the end 136 of the arm 132 or the light from the laser beam aligns with the portion of the line proximate to the fourth coupler 48. The portion of the line proximate to the fourth coupler 48 forms a fourth indicia. The pipe mount 102 allows for the foot 100 to pivot to provide for this movement. It is to be understood that the scale 50 can be aligned with any three of the couplers 42, 44, 46, 48 and in any order. This positions the pipe machining apparatus 20 in the proper plane.

In a second method, the three or more marks are provided. In an embodiment, three marks which are 120 degrees apart from each other are provided. In order to position the pipe machining apparatus 20 in the proper plane, the tool carrier 26 is rotated relative to the frame 24 to align the scale 50 with the first mark which defines a first indicia. The end 136 of the arm 132 is moved into engagement with the surface of the pipe P, or the laser beam is activated to shine onto the surface of the pipe P. If the end 136 of the arm 132 or the light from the laser beam does not align with the first mark, the second coupling member 60 of one or more of the couplers 42, 44, 46, 48 is actuated to move the frame 24 and the tool carrier 26 parallel to the longitudinal central axis 32 until the end 136 of the arm 132 or the light from the laser beam aligns with the first mark. The pipe mounts 102 allow for the feet 100 to pivot to provide for this movement. The tool carrier 26 is then rotated relative to the frame 24 to align the scale 50 with the second mark which defines a second indicia. The end 136 of the arm 132 is moved into engagement with the surface of the pipe P, or the laser beam is activated to shine onto the surface of the pipe P. If the end 136 of the arm 132 or the light from the laser beam does not align with the second mark, the second coupling member 60 of one or more of the couplers 42, 44, 46, 48 is actuated to move the frame 24 and the tool carrier 26 parallel to the longitudinal central axis 32 until the end 136 of the arm 132 or the light from the laser beam aligns with the second mark. The pipe mounts 102 allow for the feet 100 to pivot to provide for this movement. The tool carrier 26 is then rotated relative to the frame 24 to align the scale 50 with the third mark which defines a third indicia. The end 136 of the arm 132 is moved into engagement with the surface of the pipe P, or the laser beam is activated to shine onto the surface of the pipe P. If the end 136 of the arm 132 or the light from the laser beam does not align with the third mark, the second coupling member 60 of one or more of the couplers 42, 44, 46, 48 is actuated to move the frame 24 and the tool carrier 26 parallel to the longitudinal central axis 32 until the end 136 of the arm 132 or the light from the laser beam aligns with the third mark. This positions the pipe machining apparatus 20 in the proper plane.

Once the pipe machining apparatus 20 in the proper plane, the pipe machining apparatus 20 needs to be centered on the pipe P. In order to center the pipe machining apparatus 20 on the pipe P, the tool carrier 26 is rotated relative to the frame 24 to align the scale 50 with the first coupler 42. The scale 50 is then used to determine the distance that the frame 24 is away from the surface of the pipe P at the first coupler 42. Next, the tool carrier 26 is rotated 180 degrees relative to the frame 24 to align the scale 50 with the third coupler 46 which is diametrically opposed to the first coupler 42. The scale 50 is then used to determine the distance that the frame 24 is away from the surface of the pipe P at the third coupler 46. If the distances are not equal, the frame 24 and the tool carrier 26 must be moved relative to the pipe P. To move the frame 24 and the tool carrier 26 closer to the pipe P at the third coupler 46, the first coupling member 54 of the first coupler 42 is retracted from engagement with the surface of the pipe P, and the first coupling member 54 of the third coupler 46 is actuated to draw the frame 24 and the tool carrier 26 closer to the pipe P until the first and third couplers 42, 46 are at the same or about the same distance from the pipe P. To move the frame 24 and the tool carrier 26 further away to the pipe P at the third coupler 46, the first coupling member 54 of the third coupler 46 is retracted from engagement with the pipe P, and the first coupling member 54 of the first coupler 42 is actuated to move the frame 24 and the tool carrier 26 closer to the pipe P until the first and third couplers 42, 46 are at the same or about the same distance from the pipe P. This can be easily determined by finding the differences between the distances at the first and third couplers 42, 46 and dividing in two; this will let the operator know how far to actuate the appropriate first coupling member 54.

Next the tool carrier 26 is rotated relative to the frame 24 to align the scale 50 with the second coupler 44. The scale 50 is then used to determine the distance that the frame 24 is away from the surface of the pipe P at the second coupler 44. Next, the tool carrier 26 is rotated 180 degrees relative to the frame 24 to align the scale 50 with the fourth coupler 48 which is diametrically opposed to the second coupler 44. The scale 50 is then used to determine the distance that the frame 24 is away from the surface of the pipe P at the fourth coupler 48. If the distances are not equal, the frame 24 and the tool carrier 26 must be moved relative to the pipe P. To move the frame 24 and the tool carrier 26 closer to the pipe P at the fourth coupler 48, the first coupling member 54 of the second coupler 44 is retracted from engagement with the surface of the pipe P, and the first coupling member 54 of the fourth coupler 48 is actuated to draw the frame 24 and the tool carrier 26 closer to the pipe P until the second and fourth couplers 44, 48 are at the same or about the same distance from the pipe P. To move the frame 24 and the tool carrier 26 further away to the pipe P at the fourth coupler 48, the first coupling member 54 of the fourth coupler 48 is retracted from engagement with the pipe P, and the first coupling member 54 of the second coupler 44 is actuated to move the frame 24 and the tool carrier 26 closer to the pipe P until the second and fourth couplers 44, 48 are at the same or about the same distance from the pipe P. This can be easily determined by finding the differences between the distances at the second and fourth couplers 44, 48 and dividing in two; this will let the operator know how far to actuate the appropriate first coupling member 54.

The frame 24 and the tool carrier 26 can then be rotated to perform the check at the first and third couplers 42, 46 again to make any further necessary adjustments in order to finalize the centering of the pipe machining apparatus 20 on the pipe P.

After the pipe machining apparatus 20 is properly positioned, the clamps 40 are engaged to finally position the pipe machining apparatus 20 on the pipe P. Thereafter, the tool supports 36 are used to engage the tools 38 so that the cutting on the pipe P can be performed as the tools 38 rotate about the pipe P. In some embodiments, the scale 50 is removed from the tool support 36 prior to the cutting.

While the pipe machining apparatus 20 is shown mounted on the exterior of the pipe P, the pipe machining apparatus 20 may be mounted on an interior of the pipe P. When the pipe machining apparatus 20 is mounted on the interior, the positioning assembly 22 and the tool supports 36 are flipped or their orientation reversed to engage with the interior surface of the pipe P.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. For example, the pipe machining apparatus 20 may be utilized in any orientation and use of such terms is intended to correspond to the exemplary orientation of the pipe machining apparatus 20 illustrated in the drawings. The use of these terms in association with the pipe machining apparatus 20 is not intended to limit the pipe machining apparatus 20 to a single orientation or to limit the pipe machining apparatus 20 in any manner.

It should also be understood that use of numerical terms such as, for example, "first", "second", "third", etc., should not be interpreted to imply an order or sequence of components or functions. Moreover, use of these numerical terms is not intended to pertain to only the component and/or function with which they are utilized. Rather, the use of these numerical terms is merely used to assist the reader with understanding the subject matter of the present disclosure. For example, one of the components in the specification may be referenced as a "first component", but the same component may be referenced differently in the claims (e.g., second or third component).

The Abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

The invention claimed is:

1. A pipe machining apparatus configured to machine a pipe in a cutting operation, comprising:
   a frame;
   a tool carrier rotatably mounted to the frame, wherein the frame and tool carrier define a longitudinal central axis;
   a plurality of couplers equally spaced around the frame and coupled to the frame, wherein the couplers are operable to position the frame relative to the pipe prior to the cutting operation, each coupler comprising a first housing on the frame, a second housing, a third housing including a block, a ball-shaped foot extending from the block and a pipe mount configured to engage with a surface of the pipe and having a recess therein in which the ball-shaped foot seats and is pivotable relative thereto, a first coupling member coupled to the first and second housings, and a second coupling member coupled to the second and third housings, wherein the foot is configured to pivot relative to the pipe mount and to the pipe, wherein movement of the first coupling member causes radial movement of the second and third housings relative to the frame thereby engaging the third housing with the surface of the pipe, and wherein movement of the second coupling member causes movement of the first housing, the second housing, and the frame relative to the third housing to move the frame parallel to the longitudinal axis;
   a plurality of separate clamps on the frame which are spaced from the couplers and are configured to be moved into engagement with the pipe to fix the position of the frame relative to the pipe after the couplers are used to position the frame, and wherein after engagement with the pipe, the clamps maintain engagement with the pipe during the cutting operation; and
   a scale mounted on the tool carrier, the scale being configured to display a distance between the tool carrier and the surface of the pipe.

2. The pipe machining apparatus of claim 1, wherein the scale comprises a housing attached to the tool carrier, an arm extendable from the housing and which is configured to move radially relative to the frame and the tool carrier, and a display coupled to the arm and configured to display the distance of an end of the arm relative to the housing.

3. The pipe machining apparatus of claim 1, wherein the scale comprises a housing attached to the tool carrier, and an arm extendable from the housing, the arm having indicia thereon which shows distances, the arm being configured to move radially relative to the frame and the tool carrier.

4. The pipe machining apparatus of claim 1, wherein the scale is attached to the tool carrier by one of a magnet and at least one fastener.

5. The pipe machining apparatus of claim 1, wherein the scale comprises a magnet, an attachment attached to the magnet, a housing slidably attached to the attachment, an arm extendable from the housing and which is configured to move radially relative to the frame and the tool carrier, and a display coupled to the arm and configured to display a distance of an end of the arm relative to the housing.

6. The pipe machining apparatus of claim 1, wherein one of the scale and the tool carrier includes a key and the other of the scale and the tool carrier includes a keyway in which the key is inserted.

7. The pipe machining apparatus of claim 6, wherein the scale is further attached to the tool carrier by one of a magnet and at least one fastener.

8. The pipe machining apparatus of claim 1, wherein the scale provides a digital readout of the distance.

9. The pipe machining apparatus of claim 1, wherein the scale provides an 11, analog readout of the distance.

10. The pipe machining apparatus of claim 1, wherein one or more of the couplers is manually manipulated by a tool to move radially relative to the pipe machining apparatus.

11. The pipe machining apparatus of claim 1, wherein one or more of the couplers is manipulated by a driven tool to move radially relative to the pipe machining apparatus.

12. The pipe machining apparatus of claim 1, wherein in each coupler, the first coupling member is rotatably attached to the first housing and is threadedly attached to the second housing, and the second coupling member is rotatably attached to the second housing and is threadedly attached to the third housing,
   wherein rotation of the first coupling member causes radial movement of the second and third housings relative to the first housing, and
   wherein rotation of the second coupling member causes movement of the first housing, the second housing, the first coupler, the frame and the tool carrier relative to the third housing.

13. The pipe machining apparatus of claim 12, wherein one or more of the first and second coupling members is manually manipulated by a tool to move radially relative to the pipe machining apparatus.

14. The pipe machining apparatus of claim 12, wherein one or more of the first and second coupling members is manipulated by a driven tool to move radially relative to the pipe machining apparatus.

15. The pipe machining apparatus of claim 1, further comprising a tool support having a cutting blade therein, the tool support configured to be coupled to the tool carrier and to perform the cutting operation with the cutting blade when the tool carrier is rotated.

16. The pipe machining apparatus of claim 12, wherein each clamp is threadedly coupled to the frame.

17. A pipe machining apparatus configured to machine a pipe in a cutting operation, comprising:
   a frame;
   a tool carrier rotatably mounted to the frame, wherein the frame and tool carrier define a longitudinal central axis;
   a plurality of couplers equally spaced around the frame and coupled to the frame, wherein the couplers are operable to position the frame relative to the pipe prior to the cutting operation, each coupler comprising a first housing on the frame, a second housing, a third housing including a block, a ball-shaped foot extending from the block and a pipe mount configured to engage with a surface of the pipe and having a recess therein in which the ball-shaped foot seats and is pivotable relative thereto, a first coupling member coupled to the first and second housings, and a second coupling member coupled to the second and third housings, wherein the foot is configured to pivot relative to the pipe mount and the pipe, wherein movement of the first coupling member causes radial movement of the second and third housings relative to the frame
thereby engaging the third housing with the surface of the pipe, and wherein movement of the second coupling member causes movement of the first housing, the second housing, and the frame relative to the third housing to move the frame parallel to the longitudinal axis; and
a plurality of separate clamps on the frame which are spaced from the couplers and are configured to be moved into engagement with the pipe to fix the position of the frame relative to the pipe after the couplers are used to position the frame, and wherein after engagement with the pipe, the clamps maintain engagement with the pipe during the cutting operation.

18. The pipe machining apparatus of claim 17, wherein in each coupler, the first coupling member is rotatably attached to the first housing and is threadedly attached to the second housing, and the second coupling member is rotatably attached to the second housing and is threadedly to the third housing, wherein rotation of the first coupling member causes radial movement of the second and third housings relative to the first housing, and wherein rotation of the second coupling member causes movement of the first housing, the second housing, the first coupler, the frame and the tool carrier relative to the third housing.

19. The pipe machining apparatus of claim 17, further comprising a tool support having a cutting blade therein, the tool support configured to be coupled to the tool carrier and to perform the cutting operation with the cutting blade when the tool carrier is rotated.

* * * * *

UNITED STATES PATENT AND TRADEMARK OFFICE
CERTIFICATE OF CORRECTION

PATENT NO. : 12,358,062 B2
APPLICATION NO. : 17/371248
DATED : July 15, 2025
INVENTOR(S) : Roy C. Coakley Page 1 of 1

It is certified that error appears in the above-identified patent and that said Letters Patent is hereby corrected as shown below:

In the Claims

In Column 11, Claim 1, Line 31, delete "frame" and insert -- frame, --, therefor.

In Column 12, Claim 9, Line 13, delete "11, analog" and insert -- analog --, therefor.

In Column 13, Claim 17, Line 2, delete "frame" and insert -- frame, --, therefor.

Signed and Sealed this
Ninth Day of September, 2025

Coke Morgan Stewart
*Acting Director of the United States Patent and Trademark Office*